(12) United States Patent
Dahlin et al.

(10) Patent No.: US 6,571,157 B1
(45) Date of Patent: May 27, 2003

(54) OIL PRESSURE DIAGNOSTIC STRATEGY FOR A HYBRID ELECTRIC VEHICLE

(75) Inventors: Greg Dahlin, Livonia, MI (US);
Joseph Francis Valascho, Utica, MI (US)

(73) Assignees: Ford Global Technologies, LLC, Dearborn, MI (US); Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/063,848

(22) Filed: May 17, 2002

(51) Int. Cl.[7] .................................................. G06F 7/00
(52) U.S. Cl. .......................... 701/22; 701/86; 701/104; 73/117.2
(58) Field of Search ............................. 701/22, 84, 86, 701/101, 102, 104, 105, 114; 73/117.2, 117.3

(56) References Cited

U.S. PATENT DOCUMENTS

| | | | |
|---|---|---|---|
| 4,054,117 A | 10/1977 | Palmer et al. | |
| 4,489,311 A | 12/1984 | Lang et al. | |
| 5,229,745 A | 7/1993 | Koide et al. | |
| 5,343,970 A | 9/1994 | Severinsky | |
| 5,483,835 A | 1/1996 | Ciolli | |
| 6,112,150 A | * 8/2000 | Irons et al. | .................. 701/114 |
| 6,259,981 B1 | * 7/2001 | Wilcosky | ..................... 701/29 |

* cited by examiner

*Primary Examiner*—Gertrude Arthur
(74) *Attorney, Agent, or Firm*—Foster Swift; Carlos L. Hanze

(57) ABSTRACT

A diagnostic system for controlling an engine low oil pressure indicator in a hybrid electric vehicle includes a powertrain having an engine and an electric traction motor, an oil pressure sensor/sending unit mechanically connected to the engine, an engine speed sensor/sending unit mechanically connected to the engine, a controller having connections to the oil pressure sensor and engine speed sensor, a low oil pressure indicator electrically connected to the controller, a mode selector having modes for "off" and "run/start", the controller being configured to prevent activation of the low oil pressure indicator when the mode selector is in the "run/start" mode and the engine is not running.

21 Claims, 5 Drawing Sheets

OIL PRESSURE DIAGNOSTIC STRATEGY FOR A HYBRID ELECTRIC VEHICLE

BACKGROUND OF THE INVENTION

The present invention relates generally to a hybrid electric vehicle (HEV), and specifically a strategy to control a low oil pressure indicator of an HEV's internal combustion engine (ICE).

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown. Nevertheless, new ways must be developed to optimize the HEV's potential benefits.

One such area of HEV development is a strategy to indicate diagnose a low oil pressure condition in the HEV's engine. Control strategies to indicate diagnose low engine oil pressure are known in the prior art for conventional ICE powered vehicles. Typically, a pressure switch/sender unit defaults to a closed position when engine oil pressure drops below some predetermined minimal threshold condition when the vehicle is in a "run" condition. This minimum threshold condition activates a low oil pressure indicator, such as a "low oil pressure" lamp in an instrument cluster of a vehicle or an audible warning or both. The typical, current configuration helps protects the engine by causing the indicator to activate during a system failure, such as when a wire connection is missing wire connection or during a system ground fault, such failure will cause the indicator to activate. This configuration also acts as a de facto "prove-out" or test of the low oil pressure indicator during engine startup, since a typical engine takes time (approximately 300 mSec) to develop enough engine oil pressure to open the switch, thereby deactivating the low oil pressure indicator.

Unfortunately, this prior art strategy will not work in an HEV. The HEV's engine does not run continuously. When the HEV switches to all electric drive or while the vehicle is not in motion, the vehicle is still in "run" mode. However, the low oil pressure indicator would be activated since the oil pressure is not sufficient in the engine to deactivate the indicator. An oil pressure indicator diagnostic strategy for an HEV that activates appropriately needs to be developed.

SUMMARY OF INVENTION

Accordingly, the present invention provides a diagnostic strategy for controlling a low oil pressure indicator of an internal combustion engine (ICE) for a hybrid electric vehicle (HEV). The HEV has a mode selector, which typically has modes for "off" and "run/start", and a powertrain with an engine and an electric traction motor. The strategy has an oil pressure sensor/sending unit (oil pressure sensor) and an engine speed sensor/sending unit (engine speed sensor) mechanically connected to the engine. The strategy uses a controller that is connected to the oil pressure sensor and engine speed sensor, and a low oil pressure indicator electrically connected to the controller. An object of the present invention is to prevent activation of the low oil pressure indicator when the mode selector is in the "run/start" mode and the engine is not running, or during engine start up and shut down procedures.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
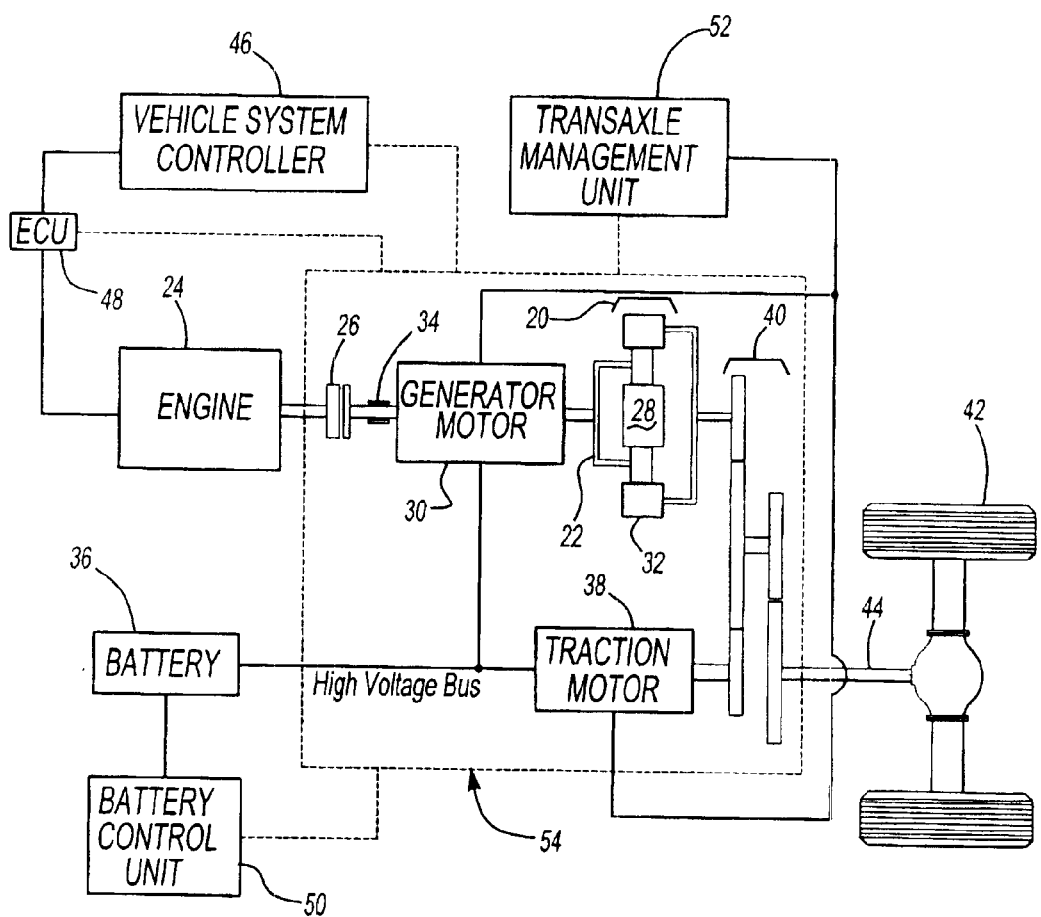
FIG. 1 illustrates a general hybrid electric vehicle (HEV) configuration.

The present invention relates to electric vehicles and, more particularly, hybrid electric vehicles (HEVs). FIG. 1 demonstrates just one possible configuration, specifically a parallel/series hybrid electric vehicle (powersplit) configuration.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface.

Figure 2:
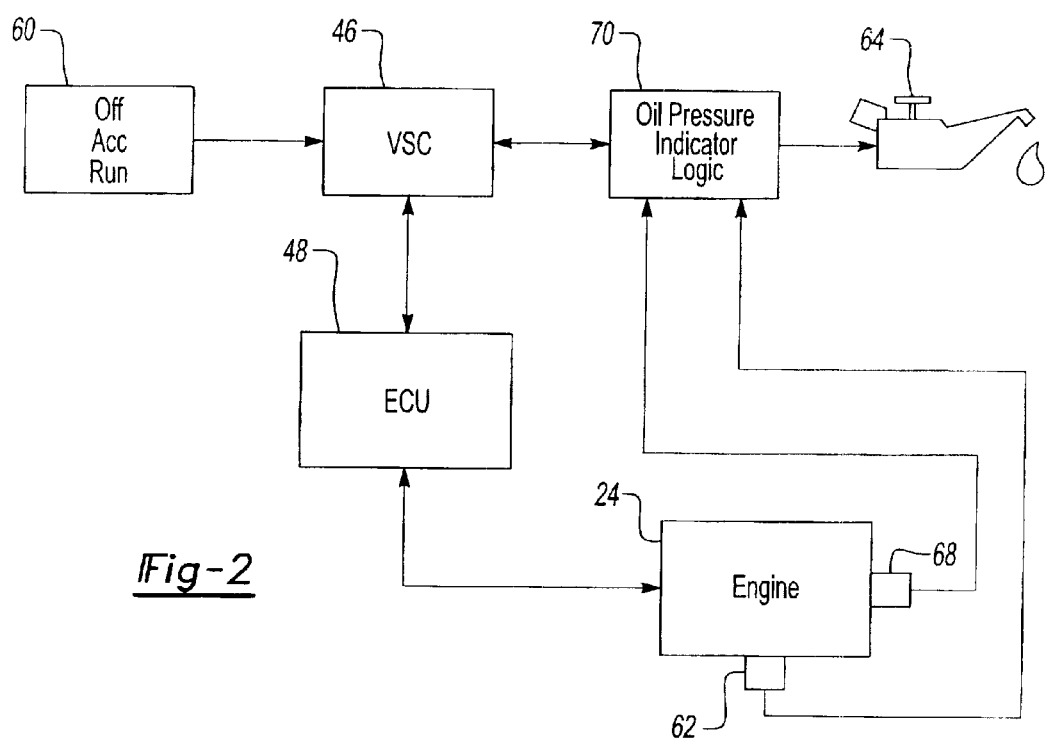
FIG. 2 illustrates an oil pressure sensing and indicating configuration for a hybrid electric vehicle (HEV) of the present invention.

FIG. 2 illustrates an overall oil pressure sensing and indicating configuration for an HEV of the present invention. An operator controlled mode selector 60 activates and deactivates the vehicle. For example, the activation and deactivation of the vehicle can be a "key-on" or "key-off" event. A typical "key-on" event can be a transition of the mode selector 60 from an "off" mode to a "start" or "run" mode. Further, the "key-on" events can further include an "acc" (accessories) mode. From the mode selector 60, the mode selector 60 output is sent to the VSC 46 and the VSC 46 output is sent to the engine 24 via the ECU 48. Other controls within the VSC 46 determine the vehicle operating state, including, engine 24 power only, traction motor 38 only, and combined power. For the present invention, an oil pressure sensor 62 and engine speed sensor 68 are added and mechanically connected to the engine 24 to measure engine 24 oil pressure and engine 24 speed respectively. The present invention also contains a controller connecting the oil pressure sensor 62 and the engine speed sensor 68. The output of the oil pressure sensor 62 and engine speed sensors 68 is sent to an oil pressure indicator logic unit (OPIL) 70. The OPIL 70 can be integrated into the VSC 46 or can be a stand-alone piece of hardware. For the illustrated embodiments the VSC 46 and OPIL 70 are stand-alone pieces.

The OPIL 70 determines whether to send a signal to activate a low oil pressure indicator 64. The low oil pressure indicator 64 can be electrically connected to the OPIL and can be a conventional "Low oil pressure" lamp in a vehicle instrument cluster or any other means known in the art to indicate that vehicle engine 24 oil pressure is low, such as an audible tone or a combination of a tone and a lamp.

Figure 3:
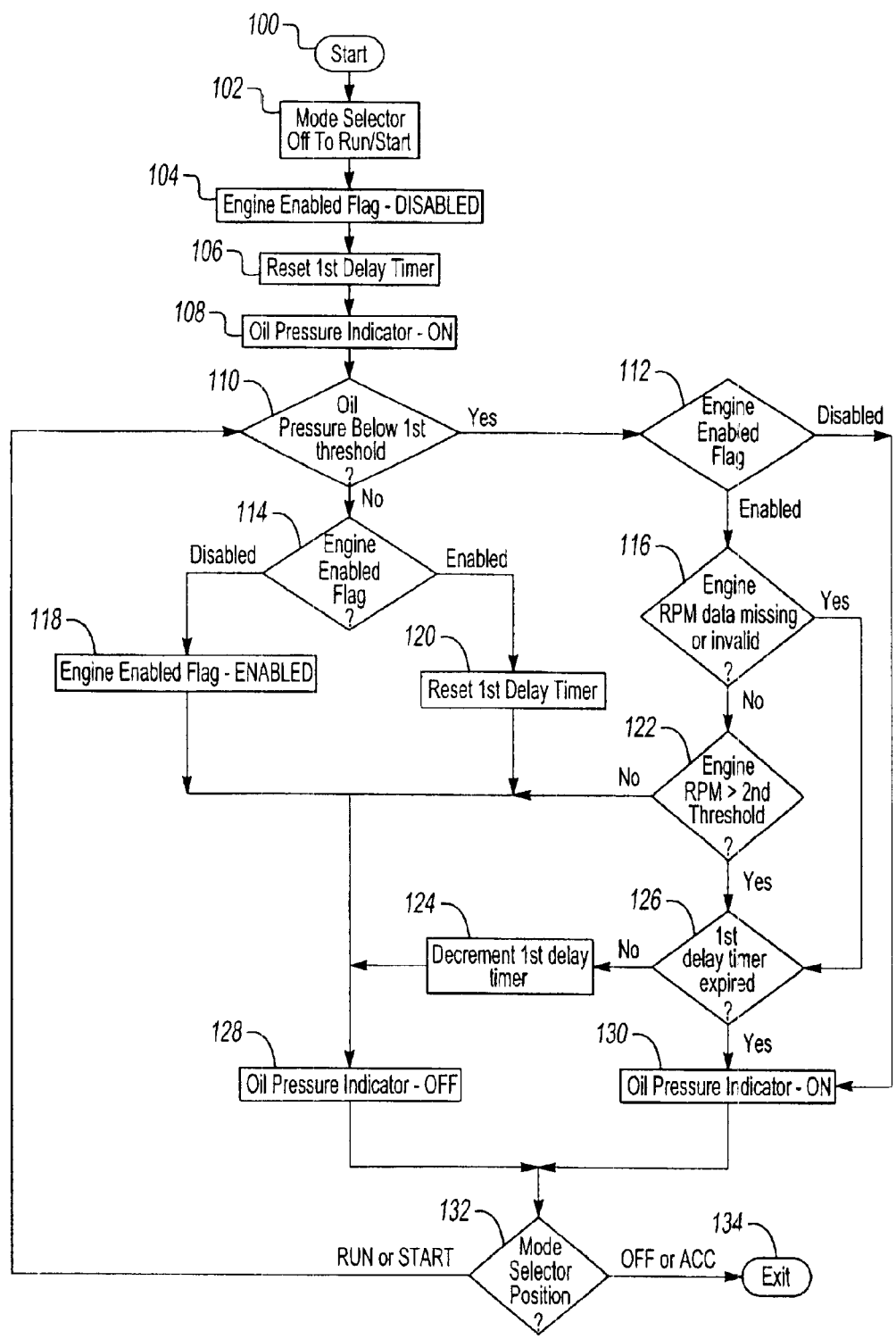
FIG. 3 illustrates the low oil pressure indication diagnostic strategy of the present invention.

FIG. 3 illustrates a first embodiment of the diagnostic strategy of the present invention to determine whether the low oil pressure indicator 64 needs to be activated. This embodiment assumes the engine 24 turns on at each "key on" cycle. The mode selector comprises modes for "off" and "run/start." The strategy can prevent activation of the low oil pressure indicator 64 when the mode selector is in the "run/start" mode and the engine is not running.

The strategy is entered and started at step 100 when the operator controlled mode selector 60 is switched by the operator from "OFF" to "RUN/START" at step 102. An engine enabled flag is set to DISABLED at step 104. At step 106, a first delay timer is reset to its maximum value, by way of example only, of about 1 second. The first delay timer acts to prevent the low oil pressure indicator 64 from activating until a low oil pressure condition has existed for a predetermined time period equal to the maximum timer value. At step 108, the oil pressure indicator 64 is commanded ON.

Next, at step 110, the OPIL 70 compares the engine 24 oil pressure from the oil pressure sensor 62 to a first predetermined threshold value. By way of example only, the first predetermined threshold value for engine 24 oil pressure can be in the range of about 4.5 to about 7 pounds per square inch (psi). If the oil pressure sensor 62 indicates that the engine 24 oil pressure is not below the first predetermined threshold value, then the strategy moves to step 114 and determines whether the engine enable flag is ENABLED or DISABLED. If the oil pressure is below the first predetermined threshold value, then the strategy moves to step 112 and determines whether the engine enable flag is ENABLED or DISABLED.

If at step 114 the engine enabled flag is DISABLED, the engine enabled flag is set to ENABLED at step 118, the strategy proceeds to step 128, and at step 128 the strategy sets the oil pressure indicator 64 to OFF. If at step 114 the engine enabled flag is ENABLED, the first delay timer is reset at step 120 and the strategy proceeds to step 128. At step 128, the strategy sets the oil pressure indicator 64 to OFF.

As stated above, at step 112, the strategy determines whether the engine enabled flag is set to ENABLED or DISABLED. If the engine enabled flag is set to DISABLED, the strategy moves to step 130 and sets the low oil pressure indicator 64 to ON. If the engine enabled flag is set to ENABLED at step 112, the strategy proceeds to step 116.

At step 116 the strategy determines whether it has been receiving erroneous data from the engine speed sensor 68. For example, the strategy determines whether the engine speed sensor 68 data is missing or invalid. If at step 116 the strategy determines the OPIL 70 is receiving erroneous data, the strategy moves to step 126 to monitor and determine whether the first delay timer has expired, meaning the first delay timer has reached zero or some other minimal value. By referring back to the first delay timer, the system ensures that the low oil pressure indicator 64 will only be switched ON if erroneous data is received for a time period greater than that of the first delay timer. If at step 116 the engine speed sensor 68 data is determined to be present and valid, the strategy moves to step 122, and compares the engine speed to a second predetermined threshold value. By way of example only, the second predetermined threshold for engine speed can be about 500 revolutions per minute (rpm).

If at step 122 the engine 24 speed is determined to be above the second predetermined threshold, the strategy moves to step 126 and determines whether the first delay timer has expired. If at step 122 the engine 24 speed is not above the second predetermined threshold at step 122, the strategy commands the low oil pressure indicator 64 to OFF at step 128.

If at step 126 the first delay timer has not expired, the strategy moves to step 124 and decrements the first delay timer. Put another way, at step 124 the timer value is reduced by a predetermined time. Then, the strategy commands the low oil pressure indicator 64 to OFF at step 128 and proceeds to step 132. If at step 126 the first delay timer has expired, the strategy commands the oil pressure indicator to ON at step 130 and proceeds to step 132.

At step 132, the strategy determines the position of the mode selector 60. If the mode selector 60 is in the RUN/START mode, the strategy returns to step 110. If the mode selector 60 is OFF or in ACC mode, the strategy exits at step 134.

Figure 4A:
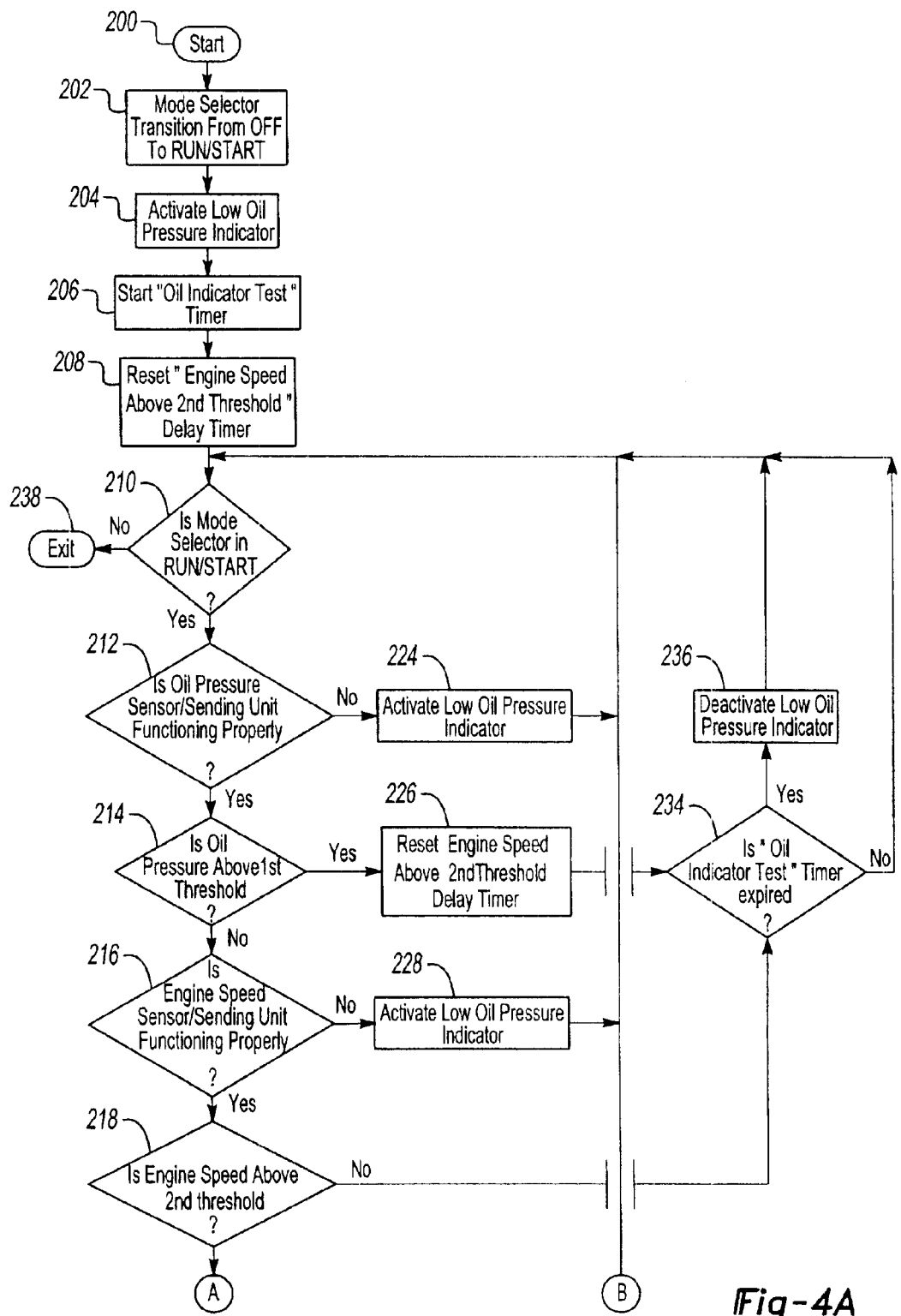
FIGS. 4A–4B illustrate an alternate embodiment of the low oil pressure indication diagnostic strategy of the present invention.
Figure 4B:
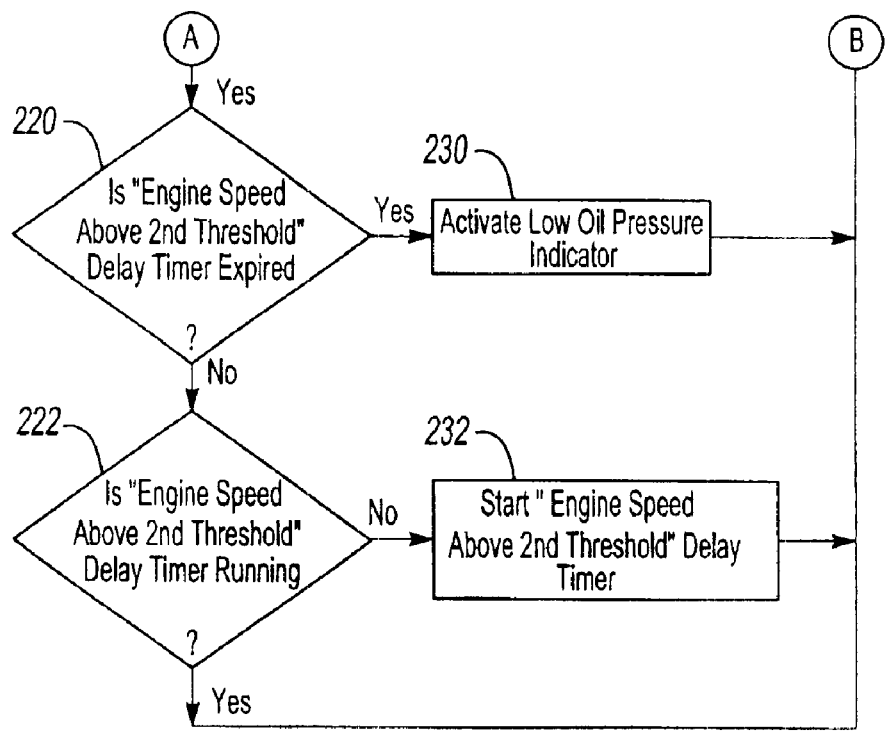

An alternate embodiment for the diagnostic strategy of the present invention is illustrated in FIG. 4. This embodiment differs from the first embodiment in that this embodiment does not assume the engine 24 turns on at each "key on" cycle. Additionally, this embodiment checks for proper operation of the oil pressure sensor 62 and engine speed sensor 68.

The strategy is entered at step 200 and transitions to step 202 when the mode selector 60 transitions from OFF or ACC (not shown) to RUN/START. Next, the oil pressure indicator 64 is activated at step 204; an oil indicator test timer is reset and activated at step 206; and a second timer, an engine 24 speed above second threshold delay timer, is reset at step 208. By way of example only, the oil indicator test timer can be about 3 seconds and the engine 24 speed above second threshold delay timer can be about 1 second.

At step 210, the strategy determines whether the mode selector 60 is still in the RUN/START mode. If the mode selector 60 is not in RUN/START the strategy exits at step 238. If the mode selector 60 is in RUN/START mode, the strategy proceeds to step 212, where the strategy determines whether the oil pressure sensor 62 is functioning properly.

If at step 212 the oil pressure sensor 62 is not functioning properly, the low oil pressure indicator 64 is activated at step 224 and the strategy returns to step 210. In addition to activating the low oil pressure indicator 64 at step 224, the strategy could also send an error message to the VSC 46. If at step 212 the oil pressure sensor 62 is functioning properly, the strategy proceeds to step 214.

At step 214, the strategy compares and determines whether the engine 24 oil pressure is above a first predetermined threshold value. This first predetermined threshold value can be in the range of about 4.5 to about 7 psi. If the engine 24 oil pressure is not above the first predetermined threshold value, the strategy proceeds to step 216. If the engine 24 oil pressure is above the first predetermined threshold value at step 214, the strategy proceeds to step 226 where the engine speed above second threshold delay timer is monitored and reset. Then, the strategy moves to step 234 to monitor and determine whether the oil indicator test timer, activated in step 206, has expired. If the oil indicator test timer has expired at step 234, the strategy proceeds to step 236 where the low oil pressure indicator 64 is deactivated and the strategy returns to step 210. If the oil indicator test timer has not expired at step 234, the strategy skips step 236 and returns to step 210.

If the engine 24 oil pressure is below the first predetermined threshold at step 114, the strategy determines at step 116 whether the engine speed sensor 68 is functioning properly. If the engine speed sensor 68 is not functioning properly, the low oil pressure indicator 64 is activated at step 228 and the strategy returns to step 210. Again, in addition to activating the low oil pressure indicator 64 at step 228, the strategy can also send an error message to the VSC 46. If, at step 216, the engine speed sensor 68 is functioning properly, the strategy proceeds to step 218.

At step 218, the strategy determines whether the engine 24 speed is above a second predetermined threshold value. This second predetermined threshold value can be about 500 rpm. If the engine 24 speed is not above the second predetermined threshold value, the strategy proceeds to step 234, described more fully above. If the engine 24 speed is above the second predetermined threshold value, the strategy proceeds to step 220 to determine if the engine speed above second threshold delay timer, activated in step 208, has expired.

If at step 220 the engine speed above second threshold delay timer has expired, the low oil pressure indicator 64 is activated at step 230 and the strategy returns to step 210. If the engine speed above second threshold delay timer has not expired, the strategy proceeds to step 222 where the strategy monitors and determines whether the engine speed above second threshold delay timer is running.

If at step 222 the engine speed above second threshold delay timer is not running, the engine speed above second threshold delay timer is started at step 232 and the strategy returns to step 210. If the engine speed above second threshold delay timer is running, the strategy returns to step 210. The strategy continues until the mode selector 60 transitions from "RUN" or "START" at which time the strategy ends.

The above-described embodiments of the invention are provided purely for purposes of example. Many other variations, modifications, and applications of the invention may be made.

What is claimed is:

1. A diagnostic system for controlling an engine low oil pressure indicator in a hybrid electric vehicle, comprising:

a powertrain having an engine and an electric traction motor;

an oil pressure sensor/sending unit mechanically connected to the engine;

an engine speed sensor/sending unit mechanically connected to the engine;

a controller having connections to the oil pressure sensor and engine speed sensor;

a low oil pressure indicator electrically connected to the controller;

a mode selector having modes for "off" and "run/start"; and the controller configured to prevent activation of the low oil pressure indicator when the mode selector is in the "run/start" mode and the engine is not running.

2. The diagnostic system of claim 1, wherein the controller comprises:
   an engine enabled flag;
   a first delay timer;
   a determination of mode selector position;
   a system to set the engine enabled flag to DISABLED or ENABLED;
   a system to reset, decrement, and monitor the first delay timer;
   a determination of whether the engine enabled flag is ENABLED or DISABLED;
   a comparison of engine oil pressure to a first predetermined threshold value;
   a determination of whether data from the engine speed sensor/sending unit is missing or invalid;
   a comparison of engine speed to a second predetermined threshold value;
   a system to activate the low oil pressure indicator when engine oil pressure is below the first predetermined threshold value, the engine enabled flag is set to ENABLED, the engine speed data is missing or invalid and the first delay timer has expired; and
   a system to activate the low oil pressure indicator when engine oil pressure is below the first predetermined threshold value, the engine enabled flag is set to ENABLED, the engine speed data is not missing or invalid, engine speed is above the second predetermined threshold value and the first delay timer has expired.

3. The diagnostic system of claim 2, further comprising a system to deactivate the low oil pressure indicator when:
   engine oil pressure is above the first predetermined threshold value;
   engine oil pressure is below the first predetermined threshold value, the engine enabled flag is set to ENABLED, the engine speed data is not missing or invalid and engine speed is not above the second predetermined threshold value; and
   engine oil pressure is below the first predetermined threshold value, the engine enabled flag is set to ENABLED, the engine speed data is not missing or invalid and engine speed is above the second predetermined threshold value and the first delay timer has not expired.

4. The controller of claim 2, wherein the first delay timer duration is about 1 second.

5. The controller of claim 2, wherein the first predetermined threshold value for engine oil pressure is in the range of about 4.5 to about 7 pounds per square inch.

6. The controller of claim 2, wherein the second predetermined threshold value for engine speed is about 500 revolutions per minute.

7. The diagnostic system of claim 1, wherein the controller comprises:
   an oil indicator test timer;
   an engine speed above a second threshold delay timer;
   a system to reset and monitor the oil indicator test timer;
   a system to reset and monitor the engine speed above the second threshold delay timer;
   a determination of mode selector position;
   a determination of whether the oil pressure sensor is functioning properly;
   a comparison of engine oil pressure to a first predetermined threshold value;
   a determination of whether the engine speed sensor is functioning properly;
   a comparison of engine speed to a second predetermined threshold value;
   a system to activate the low oil pressure indicator when
      the mode selector transitions from the off mode to the run/start mode,
      the mode selector is in the run/start mode and the oil pressure sensor is not functioning properly,
      the mode selector is in the run/start mode and the engine speed sensor is not functioning properly,
      the oil pressure sensor is functioning properly, engine oil pressure is below the first predetermined threshold value, the engine speed sensor is functioning properly, engine speed is above the second predetermined threshold value and the engine speed above second threshold delay timer has expired; and
   a system to deactivate the oil pressure indicator when
      the mode selector is in run/start mode and the oil pressure sensor unit is functioning properly, engine oil pressure is above the first predetermined threshold value, and the oil indicator test timer has expired,
      the mode selector is in the run/start mode, the oil pressure sensor/sending unit is functioning properly, engine oil pressure is below the first predetermined threshold value, the engine speed sensor is functioning properly, engine speed is below the second predetermined threshold value and the oil indicator test timer has expired.

8. The diagnostic system of claim 7, further comprising a system to send an error message to a vehicle system controller when the oil pressure sensor is not functioning properly.

9. The diagnostic system of claim 7, further comprising a system to send an error message to a vehicle system controller when the engine speed sensor is not functioning properly.

10. The diagnostic system of claim 7, wherein the oil indicator test timer has a duration of about 3 seconds.

11. The diagnostic system of claim 7, wherein the engine speed above second threshold delay timer has a duration of about 1 second.

12. The diagnostic system of claim 7, wherein the first predetermined threshold value for engine oil pressure is in a range of about 4.5 to about 7 pounds per square inch.

13. The diagnostic system of claim 7, wherein the second predetermined threshold value for engine speed is about 500 revolutions per minute.

14. The diagnostic system of claim 1, wherein the low oil pressure indicator comprises a lamp.

15. The diagnostic system of claim 1, wherein the low oil pressure indicator comprises a tone.

16. The diagnostic system of claim 1, wherein the low oil pressure indicator comprises a lamp and a tone.

17. A diagnostic method for controlling an engine low oil pressure indicator in a hybrid electric vehicle having an engine and an electric traction motor powertrain, comprising the steps of:
   sensing engine oil pressure;
   sensing engine speed;
   inputting oil pressure sensor and engine speed sensor to a controller;
   connecting a low oil pressure indicator to the controller;
   indicating vehicle mode for "off" and "run/start"; and preventing activation of the low oil pressure indicator when the mode selector is in the "run/start" mode and the engine is not running.

18. The diagnostic method of claim 17, further comprising the step of activating the low oil pressure indicator when engine oil pressure is below a first predetermined threshold value, an engine enabled flag is set to ENABLED, engine speed data is not missing or invalid, engine speed is above a second predetermined threshold value and a first delay timer has expired.

19. The diagnostic method of claim 18, further comprising the step of:
   deactivating the low oil pressure indicator when engine oil pressure is above the first predetermined threshold value;
   deactivating the low oil pressure indicator when engine oil pressure is below the first predetermined threshold value, the engine enabled flag is set to ENABLED, the engine speed data is not missing or invalid and engine speed is not above the second predetermined threshold value; and
   deactivating the low oil pressure indicator when engine oil pressure is below the first predetermined threshold value, the engine enabled flag is set to ENABLED, the engine speed data is not missing or invalid and engine speed is above the second predetermined threshold value and the first delay timer has not expired.

20. An article of manufacture for operating an engine low oil pressure indicator in a hybrid electric vehicle comprising:
   a low oil pressure indicator electronically connected to a controller;
   a mode selector electronically connected to the controller; and
   a control strategy embodied in the controller comprising an engine enabled flag,
   a determination of mode selector position,
   a system to set the engine enabled flag to DISABLED or ENABLED,
   a determination of whether the engine enabled flag is ENABLED or DISABLED,
   a comparison of engine oil pressure to a first predetermined threshold value,
   a comparison of engine speed to a second predetermined threshold value,
   a system to activate the low oil pressure indicator, and
   a system to deactivate the low oil pressure indicator.

21. An automotive vehicle comprising:
   a low oil pressure indicator electronically connected to a controller;
   a mode selector electronically connected to the controller; and
   a control strategy embodied in the controller comprising an engine enabled flag,
   a determination of mode selector position,
   a system to set the engine enabled flag to DISABLED or ENABLED,
   a determination of whether the engine enabled flag is ENABLED or DISABLED,
   a comparison of engine oil pressure to a first predetermined threshold value,
   a comparison of engine speed to a second predetermined threshold value,
   a system to activate the low oil pressure indicator, and
   a system to deactivate the low oil pressure indicator.

* * * * *